United States Patent [19]
Haub, Jr.

[11] 3,742,123
[45] June 26, 1973

[54] INSULATOR FOR ELECTRIC WIRES

[76] Inventor: LeRoy E. Haub, Jr., 4401 Clarmont Court, Bridgeton, Mo. 63044

[22] Filed: Nov. 25, 1970

[21] Appl. No.: 92,667

[52] U.S. Cl. ............... 174/138 F, 93/94 R, 174/87, 339/116 R
[51] Int. Cl. .................... H01r 5/12, H01b 17/00
[58] Field of Search.................. 174/5 R, 10, 74 A, 174/84 R, 87, 135, 137 R, 138 F, 167; 339/116 R, 116 C, 213 R, 213 T; 24/DIG. 11; 93/94 R; 150/52 R; 138/DIG. 1, 96 R; 156/184, 191, 217, 218; 206/DIG. 18; 229/5.8, 93

[56] References Cited
UNITED STATES PATENTS

| | | | |
|---|---|---|---|
| 3,515,798 | 6/1970 | Sievert | 174/135 |
| 722,881 | 3/1903 | Paine | 93/94 R X |
| 1,980,121 | 11/1934 | Wallace | 339/116 R |
| 2,371,913 | 3/1945 | Phillips et al. | 138/96 R |
| 2,694,747 | 11/1954 | Werkhaven | 174/87 |

FOREIGN PATENTS OR APPLICATIONS

| | | | |
|---|---|---|---|
| 859,646 | 12/1952 | Germany | 174/87 |
| 291,201 | 5/1928 | Great Britain | 174/87 |
| 406,410 | 3/1934 | Great Britain | 174/5 R |

Primary Examiner—Laramie E. Askin
Attorney—Gravely, Lieder & Woodruff

[57] ABSTRACT

An insulator for insulating wires, said insulator being tubular in shape with a longitudinal opening therein for receiving one or more wires, said insulator adapted to cover and insulate the wire or wires and/or the ends thereof, said insulator being deformable under pressure and having pressure sensitive adhesive material on the inside surface so that said insulator adheres to said wire or wires and to itself upon sufficient deformation.

5 Claims, 11 Drawing Figures

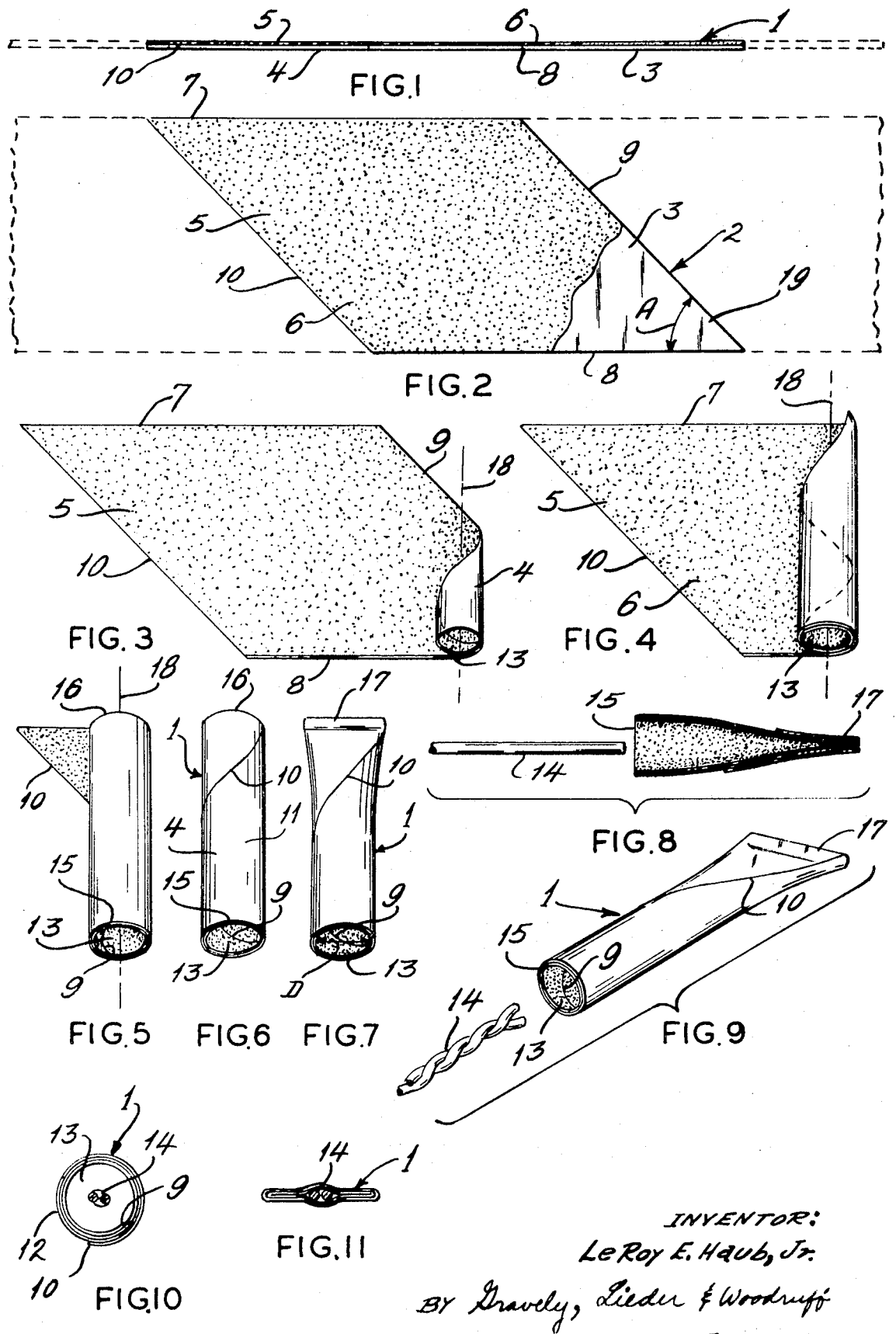

INSULATOR FOR ELECTRIC WIRES

This invention relates to an improved insulator for wires, and in particular, to a formed insulator which can be slipped over the ends of said wires and pinched together to easily and quickly insulate said wires.

Some electrical wires or the ends thereof are presently insulated by insulating tape which is wound on a roll. Such tape is used in the home by individuals, and is also used on assembly lines in plants or factories. Factory workers sometimes use reels of insulating tape to insulate the ends of wires on electrical motors and other electrical apparatus. To insulate such ends, the operator must pull the tape from the reel and cut it, unless it is automatically dispensed and cut from the roll. The operator must then wrap it by hand around the wires of small diameter. Thus, there is margin for human error, because the operator may not properly cover all of the exposed wire to be insulated or may not wrap sufficient turns around the wire so as to provide the proper thickness of insulation for the wires. Even if the operator properly performs the job, much time is consumed with the resulting expense in labor. Also in the past, there have been open and closed end heat unstable coverings for wire, but these have been made from materials which have a "memory" and which do not remain in their deformed position unless heat has been applied. With such heat shrink devices, heat is needed to shrink the material on the wire, which requires a furnace. Further, the wire to be insulated with the covering thereon must be oriented properly so that the cover will remain in proper position in the furnace as it is being heated. All of this adds to the expense of insulating the wires. Some of these prior devices have considerable bulk and do not tend to flatten and conform to the wire they are supposed to insulate.

The present device is especially useful in those installations wherein an operator presently wraps tape from a roll around a portion of wire to insulate the wire. Such insulators are used on fractional horse power motors, such as used in power tools, washers, dryers, fans, blowers, or are used in lighting fixtures and on other electrical items. The insulators embodying the present invention are used in those installations wherein tape from rolls was previously used. However, as with insulators cut from tape on rolls, these insulators may not be suitable in some installations wherein high currents or temperatures are encountered, such as in toasters, irons, and certain other electrical apparatus.

One of the principal objects of the present invention is to provide pressure deformable insulators which can be slipped over the end of the wire and compressed to insulate a portion of the wire or the ends thereof with the proper thickness of insulation. Another object is to provide a tubular insulator made from the identical insulating tape in roll form that is presently used by a manufacture so that no new insulating specifications need be written. Another object is to provide a deformable tubular insulator which can be pinched together by pressure from the fingers of an operator and without the necessity of a tool. Another object is to provide a deformable insulator which may be installed by a machine, if desired, without the necessity of a furnace.

These and other objects and advantages will become apparent hereinafter.

The invention is embodied in an insulator for wire, said insulator being tubular with an opening therein, said insulator adapted to cover and insulate the wire, said insulator being made of insulating material which is deformable under slight pressure, the inside surface of said insulator having pressure sensitive adhesive material thereon, so that said insulator adheres to said wire and to itself upon being deformed and placed in contact with said wire and opposing insulator surfaces.

The invention also consists in the parts and in the arrangements and combinations of parts hereinafter described and claimed. In the accompanying drawings which form part of this specification and wherein like numerals and letters refer to like parts wherever they occur:

FIG. 1 is an enlarged fragmentary side view of the material from which an insulator embodying the present invention is made, FIG. 2 is a bottom plan view of the material shown in FIG. 1, showing a blank from which said insulator may be formed, and showing in dotted lines the strip from which the blank may be cut, FIGS. 3, 4 and 5 show the blank being rolled into tubular form, FIG. 6 is a side view, partially tilted, of the tubular insulator formed with two open ends, FIG. 7 is a side view, partially tilted, of a modified form of insulator having one pinched or closed end, FIG. 8 is a longitudinal cross-sectional view of an insulator with a closed end about to receive a wire or wires in its open end, FIG. 9 is a perspective view of an insulator of modified form, such as shown in FIG. 7, about to receive a wire or wires in its open end, FIG. 10 is an end view of an insulator showing wires in cross-section therein prior to the insulator wall being deformed, and FIG. 11 shows said insulator after its wall has been deformed around said wires to be insulated.

Referring now to the drawings in detail, it will be seen that the embodiment of the invention which has been illustrated comprises an insulator 1 made from the same material that a user has previously been using to insulate wires. By utilizing this same material, the user does not have to make additional tests or changes specifications, since he is merely using the same material as in the past, but in different or shaped form. The insulator 1 is preferably formed from blanks or pieces 2 of the same insulator tape material which the user previously used in a roll form. The tape is cut into pieces 2, such as shown in FIG. 2.

As shown in FIG. 1, the insulator tape material has a backing 3, which forms the outside surface 4 of the insulator 1, and a pressure sensitive adhesive material 5 on one surface thereof which forms the inside surface 6 of the insulator 1.

The material from which the insulator blank 2 is made may be of any type of tape material which is presently in use to insulate wire. The backing 3 of the tape may be of a paper or woven nylon, or cellophane, or cloth. It may be reinforced, if desired, and it may have an outer layer of dissimilar material thereover. However, any material which has a "memory" and which tends to resume its open tubular shape after being pinched together should be avoided.

After a piece 2 has been cut from a roll of insulator tape (not shown), the piece 2 in flat position (FIG. 2) has an upper edge 7 and a lower edge 8 parallel thereto. The piece 2 has a left edge 9 and a right edge 10 which preferably are parallel to each other and are angularly positioned with respect to the upper edge 7 and the lower edge 8. These side edges 9 and 10 are preferably parallel to each other and form an angle A with the lower edge 8. The left edge 9 is formed by a cut angularly across the roll of tape, the cut also forming the right edge of the next adjacent piece. The angle A results in a triangular portion at the lower left of the piece 2, which permits the piece 2 to be rolled more easily from a flat position (FIG. 2) into a tube 11 (FIG. 6) having one or more thicknesses of material therein. If tape 0.0075" thick is used and the desired insulation is 0.015", then two full turns of material are needed. Therefore, the length of the lower edge 8 must be properly measured in accordance with the desired diameter of the tube 11.

A suitable method of wrapping is shown in FIGS. 2–6. The tube 11 may be wrapped in a different manner if desired, such as to form a longer insulator from the same piece 2 shown in FIG. 2, but this might require an extra operation, such as trimming one or both ends of the tubular insulator so formed with the resultant waste of material.

The insulator 1 (FIG. 6) comprises a hollow tube 11 having a wall 12 of one or more thicknesses of the material. The wall 12 has a smooth outside surface 4 and an inside surface 6 which is covered with pressure sensitive adhesive 5. The right edge 10 forms an outer helical edge, and the left edge 9 forms an inner helical edge. The tube 11 has an opening 13 having a diameter D which is greater than the greatest cross-section of the wire or wires 14 to be inserted into said opening 13 in order to insulate said wires 14. In practice, this opening 13 is preferably several times the combined cross-sectional area of the wire or wires to be insulated, although in some installations it may only be slightly larger, such as 1.5 times the diameter.

The insulator 1 may have two open ends 15 and 16 (FIG. 6). If preferred, the insulator 1 may have one open end 15 and one closed or pinched end 17 (FIG. 7–9) in which the tube 11 has merely been deformed inwardly along a diametral line until the adhesive causes the opposite halves to stick together, thereby forming the closed end 17. The advantage of a pinched or closed end 17 is that an operator may simply place the closed end insulator 1 over the ends of the wire 14 until the closed end 17 is in contact with the end edges of the wire 14. This automatically stops the insulator 1 from further longitudinal movement with respect to the wire ends and makes certain that the wire ends 14 are in fact covered with the insulator 1. With an insulator 1 having open ends 15 and 16 (FIG. 6), a careless operator may slip the insulator 1 too far up the wire 14 and leave the wire end edges exposed. However, there are some installations wherein an insulator with two opened ends is desired.

The present insulator 1 is made from pieces of tape material which are cut off at predetermined lengths, depending upon the height of the insulator to be made, its diameter, and the number of wall thicknesses desired. To conserve material and avoid cutting off one or both ends of the tube 11 after it has been rolled into tube shape, the axis of rolling 18 should be perpendicular to the upper edge 7 and lower edge 8, and the distance between said edges should be the desired height of the insulator 1. When rolled in this manner, the lower edge 8 rolls upon itself and the parallel upper edge 7 rolls upon itself. The only seams in such an insulator will be an inside helix formed by the left edge 9 and an outside helix formed by the right edge 10. If a longer insulator 1 is desired, it is preferable to make the same from material whose width or distance between the upper edge 7 and lower edge 8 is the same as the desired height of the insulator. It is not essential that the left edge 9 be parallel to the right edge 10, but if said edges are parallel then one cut of the tape material forms the adjacent edges of adjacent insulators to be formed. By slanting the edges 9 and 10 at an angle A, the triangular portion 19 is formed which permits the tube 11 to be rolled more easily. If the left edge 9 were at right angles to the lower edge 8 so that the angle A would be 90°, the tube 11 would be more difficult to form, since it would be more difficult to roll it into tube form on existing types of machines. In most installations, the insulator 1 has a length at least four times that of its diameter.

The invention herein is embodied in an insulator 1 of tubular shape with a longitudinal opening 13 therein. For some applications, it is preferred to have the insulator 1 with two open ends 15 and 16. For other applications, an insulator 1 having one closed end 17 may be preferred. Such an insulator is shown in FIGS. 7–9, wherein the insulator has one open end 15 and an end 17 which is pinched together along a diametral line. In this form, the opening 13 gradually diminishes in size toward the closed end.

With either form, that is, one or two open ends, the insulator 1 may be deformed by an operator who pinches the wall 12 of the tube 11 together until the walls 12 adhere to each other and to the wires 14 to be insulated, due to the adhesive 5 on the inside surface 6. This requires only slight pressure of the fingers on the hand, such as the thumb and forefinger. The insulators 1 also lend themselves to automated application to the wires 14 to be insulated.

The adhesive 5 on the material may be of any suitable type, but it must be compatible with the wire 14 it is to insulate. For example, it is well known that certain types of adhesives may corrode aluminum wires and such adhesives should be avoided when the insulator 1 is to be applied to aluminum wires. Typical materials which are presently used to insulate wires have a backing 3 with adhesive 5 thereon. Such materials are available on the market from well-known manufacturers and include Permacel brand electrical tape (P 275), 3 M brand electrical tape (No. 25, No. 60, etc.), Tuck brand tape, Mystic brand tape, and others. These tapes may be of woven fabrics of natural materials such as cotton or silk or fiber glass, or may be of synthetic materials such as a polyester. The base or mat material may be paper or other suitable material. The backing 3 may have a film thereon of polyester or other suitable material.

This invention is intended to cover all changes and modifications of the example of the invention herein chosen for purposes of the disclosure, which do not constitute departures from the spirit and scope of the invention.

What is claimed is:

1. An insulator for wire to be insulated, said insulator being tubular in shape with a longitudinal opening therein, said opening being larger than said wire and adapted to receive a portion of the wire therein, said insulator adapted to cover and insulate said portion of the wire, said insulator being made of non-elastic insulating material of substantially uniform thickness when in flat form, said insulator having a thin tubular wall wound in spiral fashion from a flat piece of material to form a wall of multiple thickness, said insulator being deformable under light pressure, the inside surface of said insulator having pressure sensitive adhesive material thereon, so that said insulator adheres to said wire and to itself upon being deformed to form an insulator on the wire.

2. The insulator set forth in claim 1 wherein said insulator has a tubular wall formed from a flat piece of material having two pairs of parallel edges, one pair of edges being angularly positioned with respect to the other pair of edges at an angle other than 90°.

3. The insulator set forth in claim 2 wherein the angle between said pairs of parallel edges is between 30° and 60°.

4. The insulator set forth in claim 2 wherein the angle between said pairs of parallel edges is about 45°.

5. An insulator for the ends of wire to be insulated, said insulator being tubular in shape with a longitudinal opening therein, said opening being larger than said wire and adapted to receive the end of the wire therein, said insulator having a closed end adapted to cover and insulate the end of the wire, said insulator being made of a single piece of non-elastic insulating material of substantially uniform thickness when in flat form, which material is wound in spiral fashion to form said insulator, said insulator being deformable upon pressure of the fingers of the hand or machine, the inside surface of said insulator having pressure sensitive adhesive material thereon, so that said insulator adheres to said wire and to itself upon being deformed upon light pressure to form an insulated end on the wire.

* * * * *